Sept. 22, 1931.  J. R. McWANE  1,824,560
PIPE JOINT
Filed Feb. 20, 1929

INVENTOR
James R. McWane
BY
Siggers & Adams
ATTORNEYS

Patented Sept. 22, 1931

1,824,560

UNITED STATES PATENT OFFICE

JAMES R. McWANE, OF BIRMINGHAM, ALABAMA, ASSIGNOR TO McWANE CAST IRON PIPE COMPANY, OF BIRMINGHAM, ALABAMA, A CORPORATION OF ALABAMA

PIPE JOINT

Application filed February 20, 1929. Serial No. 341,407.

This invention relates to pipe joints and, among other objects, aims to provide an improved bell and spigot calked joint for high pressure gas mains or pipes to conduct other fluids under high pressures.

This application involves an improvement on the joint disclosed and claimed in my co-pending application, Serial No. 341,406, filed February 20, 1929. My co-pending applications, Serial Nos. 431,860, filed February 27, 1930 and 480,781 filed September 9, 1930, disclose further improvements over the present pipe joint.

Figure 1:
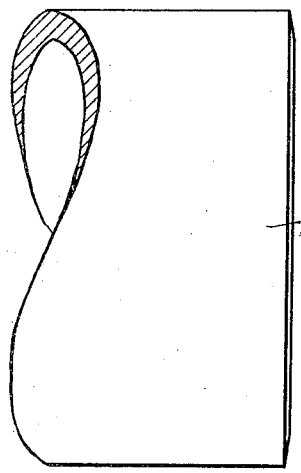
Figure 1:
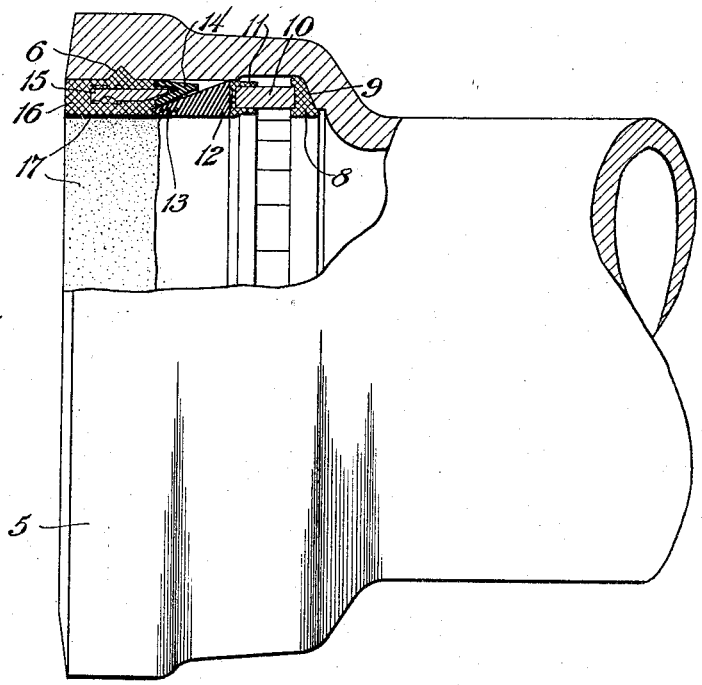
Figure 2:
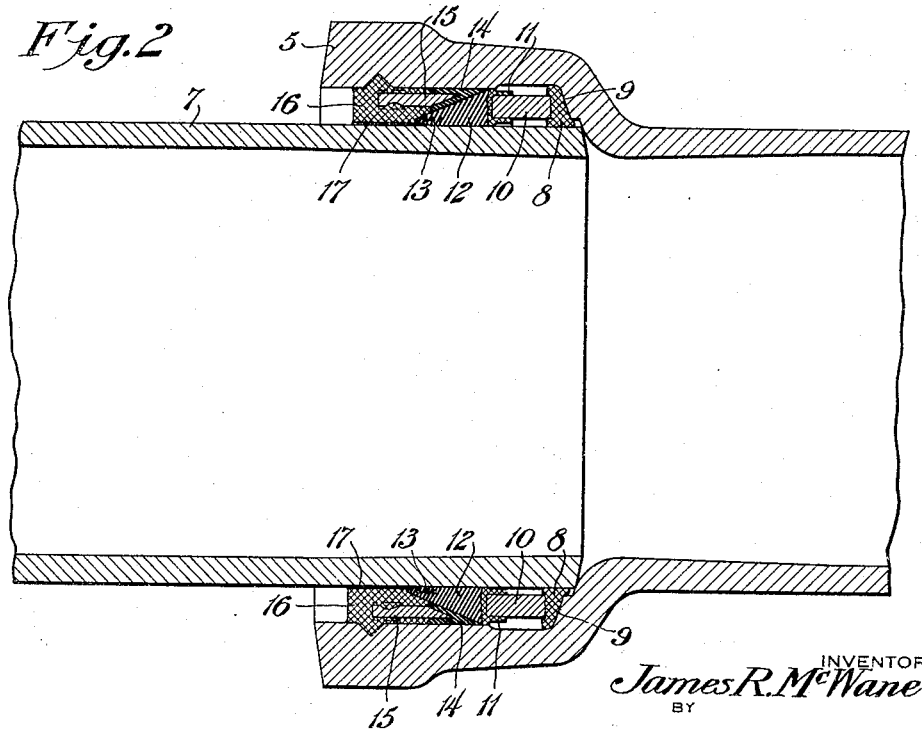

Other aims and advantages of the invention will appear in the specification considered in connection with the accompanying drawings, wherein, Fig. 1 is a fragmentary side elevation, partly in section, showing the spigot end of a pipe about to be inserted in the bell end of a pipe having a pre-formed joint packing embodying the invention applied thereto; and Fig. 2 is a view, similar to Fig. 1, showing the completed joint.

As stated in my aforesaid application, the improved joint is intended to prevent the leakage of gas or other fluids under pressure which usually results from deterioration or decomposition of the joint material or displacement of the material due to relative expansion and contraction, as well as relative lateral movements of the pipe sections. Previous attempts to produce calked, high pressure joints having these characteristics have been unsuccessful insofar as I am aware.

Referring particularly to the drawings the pre-formed joint material is shown as being assembled in the pipe bell 5 which presents a machined inner surface having a V-shaped annular locking groove 6. The materials are conveniently applied to the bell at the plant in the manner fully disclosed in the aforesaid application, a machined mandrel (not shown) of slightly larger diameter than the spigot end 7 being employed.

In the present example, a ring of calking lead 8 is first applied to the inner beveled shoulder 9 of the bell. A pre-formed ring of separate steel wedges 10 held assembled by a cast holder of calking lead 11, as shown in my Patent 1,486,777, is next inserted and initially calked slightly to compress the lead ring 8, as shown in Fig. 1. A ring gasket 12 of vulcanized rubber substantially triangular in cross section is next applied, so that its base rests on the top of the lead holder 11. The inside wall of this rubber is preferably cylindrical to contact with the outer wall of the spigot 7, and the tip is suitably re-enforced, preferably by imbedded wires 13, to prevent excessive flexing or crumpling when the spigot is being inserted. Also, the extreme edge is tapered or beveled outwardly to prevent it from becoming fouled by the spigot 7.

Within the annular space between the rubber gasket 12 and the bell, a substantially V-shaped rubber ring 14 is inserted and a pre-assembled ring of separate metal wedges 15 having inner tapered ends are forced into the V-shaped rubber ring. Molten calking lead 16 is then poured into the bell mouth and imbeds the ring of tapered wedges 15 filling the bell.

The spigot 7 is preferably made smooth by means of a file or by grinding to make sure that no molding sand or projections are left on its surface and to enable it to be inserted into the prepared packing.

To prevent the calking lead 16 from entering the pores in the surface of the spigot or adhering to it, so that the calked joint will be damaged by relative movements of the pipe sections and thereby permitting leakage through the joint, a parting substance such as a coating of plastic or liquid rubber cement 17 is applied to the inner surface of the calking lead ring 16, or it may be smeared on the entire inner surface of the joint packing. Also, if desired, it may be put on the surface of the spigot 7. This coating may be applied in the field just before the joints are calked. The cement not only permits relative expansion of the pipe sections and slight relative lateral movements without disturbing or destroying the calked lead ring but, also, serves as an effective auxiliary seal to exclude atmospheric air or moisture from the rubber gasket after such movements have taken place. If some parting means is not employed, the joints will soon leak because of the relative expansion and contraction due to ordinary changes in temperature.

Upon inspection of Fig. 2, it will be apparent that the joint is completed by a suitable calking tool (not shown). The metal wedges 15 are driven inwardly forcing the V-shaped rubber ring 14 home behind the rubber gasket 12 and thereby squeezing it tightly against the spigot. Also, the final calking compresses the lead holding ring 11 and the lead ring 8, causing them to expand or spread and provide primary and secondary seals to protect the rubber gasket against the action or attack of the gas or other fluid.

From the foregoing description, it will be seen that the rubber packing is effectively sealed between calked packing material on both sides and, hence, will not be subjected to the influence of either atmospheric air or gas. Further, the joint is sufficiently flexible to permit relative expansion or contraction of the pipes due to ordinary changes in temperature, without displacing the calked lead. Also, the joints may be made very much cheaper than the bolted gland joints and will last much longer.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. A bell and spigot pipe joint comprising, in combination, a calked primary seal at the bottom of the bell; an intermediate rubber gasket; a calked lead ring in the mouth of the bell; and a plastic parting substance between the spigot and said calked lead ring to permit the spigot to slide longitudinally with respect to the bell due to expansion and contraction without disturbing the calked lead ring and ultimately causing leakage through the joint.

2. A bell and spigot pipe joint comprising, in combination, a lead seal at the bottom of the bell; a ring of metal blocks engaging said lead seal; a sealing gasket adjacent to the said ring; a ring of calked lead in the mouth of the bell compressing the gasket against the spigot; and a coating of cement separating the calked lead ring from the surface of the spigot and serving as parting material.

3. A bell and spigot pipe joint comprising, in combination, a lead seal at the bottom of the bell; a ring of metal blocks engaging said lead seal; a sealing gasket adjacent to the said ring; a ring of calked lead in the mouth of the bell compressing the gasket against the spigot; and a thin layer of plastic parting material between the ring of calked lead and the spigot to permit relative longitudinal movement of the spigot and bell without disturbing the joint material and causing leakage through the joint.

4. In a calked bell and spigot joint having a rubber sealing gasket interposed between calked lead rings, a coating of rubber cement separating the outer lead ring from the spigot to permit longitudinal movement of the spigot due to expansion and contraction without disturbing the joint materials and causing leakage through the joint.

5. In a bell and spigot joint, a rubber gasket substantially triangular in cross section; a substantially V-shaped rubber ring between said gasket and the bell; a ring of metal blocks co-operating with said V-shaped rubber ring; a calked lead ring imbedding said metal blocks to hold the rubber gasket compressed; and a coating of rubber cement separating the calked lead ring from the spigot to permit longitudinal movement of the spigot due to expansion and contraction without destroying the seal.

6. A bell and spigot joint for high pressure gas mains comprising, in combination, a compressed rubber gasket; a calked lead ring holding the gasket compressed; and a coating of rubber cement between the calked lead ring and the spigot to permit the spigot to move relative to the bell without causing leakage through the joint.

In testimony, that I claim the foregoing as my own, I have hereto affixed my signature.

JAMES R. McWANE.